(12) United States Patent
Song et al.

(10) Patent No.: US 8,236,872 B2
(45) Date of Patent: Aug. 7, 2012

(54) ADHESIVE COMPOSITION AND OPTICAL MEMBER

(75) Inventors: Cheong Hun Song, Uiwang-si (KR); Hiroshi Ogawa, Uiwang-si (KR); Tatsuhiro Suwa, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/092,627

(22) Filed: Apr. 22, 2011

(65) Prior Publication Data

US 2011/0195249 A1 Aug. 11, 2011

(30) Foreign Application Priority Data

Oct. 24, 2008 (JP) ................................ 2008-274705

(51) Int. Cl.
- *C08F 4/80* (2006.01)
- *C08G 59/02* (2006.01)
- *C08G 59/06* (2006.01)
- *C08G 59/68* (2006.01)
- *C08G 65/18* (2006.01)
- *C09J 4/00* (2006.01)
- *C09J 163/00* (2006.01)
- *C09J 201/06* (2006.01)
- *C09K 19/00* (2006.01)

(52) U.S. Cl. ......... 522/31; 428/1.5; 428/1.53; 428/1.55; 522/25; 522/26; 522/27; 522/28; 522/29; 522/30; 522/66; 522/163; 522/166; 522/168; 522/169; 522/181

(58) Field of Classification Search .................. None
See application file for complete search history.

(56) References Cited

U.S. PATENT DOCUMENTS

| | | | | |
|---|---|---|---|---|
| 2006/0162771 A1* | 7/2006 | Inoue et al. | ..................... | 136/263 |
| 2007/0231566 A1* | 10/2007 | Yoneyama et al. | ............. | 428/331 |
| 2008/0076900 A1* | 3/2008 | Oshimi et al. | ................... | 528/43 |
| 2008/0266661 A1* | 10/2008 | Nakamura | ..................... | 359/485 |

FOREIGN PATENT DOCUMENTS

| | | | |
|---|---|---|---|
| JP | 06 306345 A | | 11/1994 |
| JP | 10 030081 A | | 2/1998 |
| JP | 2001 288440 A | | 10/2001 |
| JP | 2002 235066 A | | 8/2002 |
| JP | 2003 096424 A | | 4/2003 |
| JP | 2004 161935 A | | 6/2004 |
| JP | 2004 339263 A | | 12/2004 |
| JP | 2004-339263 A | * | 12/2004 |
| JP | 2006 008740 A | | 1/2006 |
| JP | 2006-8740 A | * | 1/2006 |
| JP | 2007 284680 A | | 11/2007 |
| JP | 2007-284680 A | * | 11/2007 |

OTHER PUBLICATIONS

Cho et al., "Photo-curing kinetics for the UV-initiated cationic polymerization of a cycloaliphatic diepoxide system photosensitized by thioxanthone," European Polymer Journal, vol. 41, 2005, pp. 367-374.*

* cited by examiner

*Primary Examiner* — Robert Sellers
(74) *Attorney, Agent, or Firm* — Lee & Morse, P.C.

(57) ABSTRACT

A photocationically polymerizable adhesive composition and an optical member, the photocationically polymerizable adhesive composition including about 75 to about 99.8 parts by weight of a compound including one of aliphatic epoxy, alicyclic epoxy, oxetane, and vinyl ether compounds, about 0.1 to about 5 parts by weight of a titanate coupling agent, and about 0.1 to about 20 parts by weight of a photopolymerization initiator, wherein a sum of weights of the compound, the titanate coupling agent, and the photopolymerization initiator is 100 parts by weight.

16 Claims, No Drawings

ADHESIVE COMPOSITION AND OPTICAL MEMBER

CROSS-REFERENCE TO RELATED APPLICATION

This application is a continuation of pending International Application No. PCT/JP2009/068265, entitled "Adhesive Composition And Optical Member," which was filed on Oct. 23, 2009, the entire contents of which are hereby incorporated by reference.

BACKGROUND

1. Field

Embodiments relate to an adhesive composition and an optical member.

2. Description of the Related Art

Liquid crystal and organic electroluminescent (EL) displays have been mounted in a variety of mobile devices to achieve reductions in size, thickness, and weight of the mobile devices. Glass, metals (e.g., aluminum), synthetic resins (e.g., PET), and semi-synthetic resins (e.g., acetyl cellulose) may be used in substrates and display parts or elements of liquid crystal and organic EL displays. Thus, adhesives capable of strongly adhering thin films or different materials to the resins in a simple and rapid manner may be desirable.

SUMMARY

Embodiments are directed to an adhesive composition and an optical member.

The embodiments may be realized by providing a photocationically polymerizable adhesive composition, including about 75 to about 99.8 parts by weight of a compound including one of aliphatic epoxy, alicyclic epoxy, oxetane, and vinyl ether compounds, about 0.1 to about 5 parts by weight of a titanate coupling agent, and about 0.1 to about 20 parts by weight of a photopolymerization initiator, wherein a sum of weights of the compound, the titanate coupling agent, and the photopolymerization initiator is 100 parts by weight.

The titanate coupling agent may be a compound represented by Formula (1):

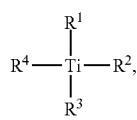
(1)

In Formula (1), $R^1$, $R^2$, $R^3$, and $R^4$ are each independently a group including one of

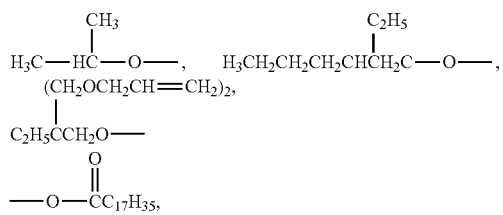

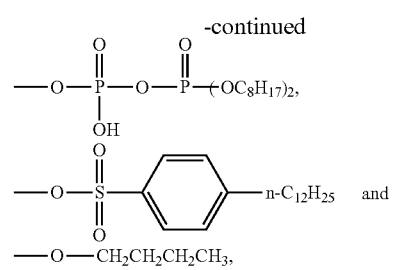

or two of $R^1$, $R^2$, $R^3$, and $R^4$ are connected to form a ring structure including one of

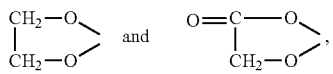

a dimer of the compound of Formula (1), or a coordination compound of the compound of Formula (1) with one of the phosphites, below:

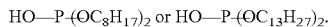

The compound may be included in an amount of about 92 to about 98.5 parts by weight.

The titanate coupling agent may be included in an amount of about 0.5 to about 3 parts by weight.

The photopolymerization initiator may be included in an amount of about 1 to about 5 parts by weight.

The photopolymerization initiator may include at least one of an onium salt and an iron-arene complex.

The photocationically polymerizable adhesive composition may further include about 0.1 to about 10 parts by weight of a photosensitizer, based on 100 parts by weight of the compound, the titanate coupling agent, and the photopolymerization initiator.

The photosensitizer may include at least one of an organosulfur compound, a persulfide, a redox compound, an azo compound, a diazo compound, a halogen compound, and a photoreductive colorant.

The embodiments may also be realized by providing an optical member including an optical sheet, wherein the photocationically polymerizable adhesive composition of an embodiment is applied to at least one side of the optical sheet.

The titanate coupling agent may be a compound represented by Formula (1):

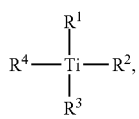
(1)

in Formula (1), $R^1$, $R^2$, $R^3$, and $R^4$ are each independently a group including one of

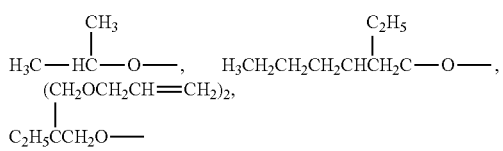

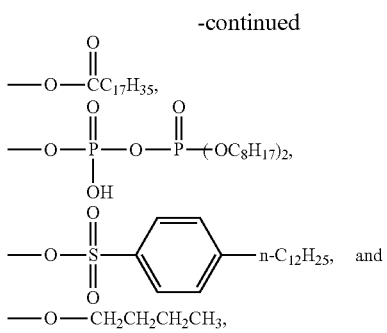

or two of $R^1$, $R^2$, $R^3$, and $R^4$ are connected to form a ring structure including one of

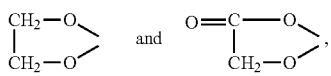

a dimer of the compound of Formula (1), or a coordination compound of the compound of Formula (1) with one of the phosphites, below:

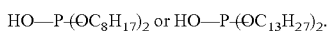

The compound may be included in an amount of about 92 to about 98.5 parts by weight.

The titanate coupling agent may be included in an amount of about 0.5 to about 3 parts by weight.

The photopolymerization initiator may be included in an amount of about 1 to about 5 parts by weight.

The photopolymerization initiator may include at least one of an onium salt and an iron-arene complex.

The optical member may further include about 0.1 to about 10 parts by weight of a photosensitizer, based on 100 parts by weight of the compound, the titanate coupling agent, and the photopolymerization initiator.

The photosensitizer may include at least one of an organosulfur compound, a persulfide, a redox compound, an azo compound, a diazo compound, a halogen compound, and a photoreductive colorant.

DETAILED DESCRIPTION

Japanese Patent Application No. 2008-274705, filed on Oct. 24, 2008, in the Korean Intellectual Property Office, and entitled: "Adhesive Composition and Optical Member," is incorporated by reference herein in its entirety for all purposes.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present.

The embodiments provide a photocationically polymerizable adhesive composition. The photocationically polymerizable adhesive composition may include about 75 to about 99.8 parts by weight of (a) a compound including at least one of aliphatic epoxy, alicyclic epoxy, oxetane, and vinyl ether compounds, about 0.1 to about 5 parts by weight of (b) a titanate coupling agent, and about 0.1 to about 20 parts by weight of (c) a photopolymerization initiator. A sum of the weights of the compound, the titanate coupling agent, and the photopolymerization initiator may be 100 parts by weight.

As described above, the photocationically polymerizable adhesive composition of an embodiment may include a compound including at least one of aliphatic epoxy, alicyclic epoxy, oxetane, and vinyl ether compounds, which may be collectively referred to as "the compound."

The aliphatic epoxy compounds may include, e.g., polyglycidyl ethers of aliphatic polyhydric alcohols or alkylene oxide (ethylene oxide or propylene oxide) adducts thereof. The aliphatic epoxy compounds are not particularly limited, and specific examples thereof may include ethylene glycol diglycidyl ether, diethylene glycol diglycidyl ether, propylene glycol diglycidyl ether, tripropylene glycol diglycidyl ether, neopentyl glycol diglycidyl ether, 1,4-butanediol diglycidyl ether, 1,6-hexanediol diglycidyl ether, trimethylolpropane triglycidyl ether, trimethylolpropane diglycidyl ether, trimethylolpropane polyglycidyl ether, polyethylene glycol diglycidyl ether, and glycerin triglycidyl ether. Trimethylolpropane triglycidyl ether, trimethylolpropane diglycidyl ether, and trimethylolpropane polyglycidyl ether are preferred because of their low viscosity.

The aliphatic epoxy compounds may be synthesized or may be commercially available. Examples of commercially available products for the aliphatic epoxy compounds may include: "EPOLITE 100MF" (trimethylolpropane triglycidyl ether) produced by Kyoeisya Chemical Co., Ltd.; "DENA-COL EX-321L" (trimethylolpropane polyglycidyl ether) produced by Nagase ChemteX Corporation; EPIKOTE 828 (bisphenol A diglycidyl ether), EPIKOTE 806 produced by Japan Epoxy Resins Co., Ltd., and YD-128 produced by Tohto Kasei, which are diglycidyl ethers of bisphenols, typified by bisphenol A, F and S; and HBE-100 (Shin Nihon Rika) and YX-4000 (Japan Epoxy Resins Co., Ltd.), which are hydrogenated bisphenol type epoxy resins. In addition to these products, glycidyl ethers having an alicyclic skeleton, e.g., diglycidyl ether of cyclohexanedimethanol [for example, DME-100 (Shin Nihon Rika)], glycidyl ethers of novolac phenolic resins, glycidyl ethers of novolac phenolic resins copolymerized with DCPD, glycidyl ethers of polycyclic aromatic compounds such as naphthalene, epoxy resins having an alicyclic skeleton and terminal epoxy groups [for example, EHPE-3150 and EHPE-3150CE (Daicel Chemical Industries Co., Ltd.)], silicone resins having epoxy groups [for example, A-186 (Nippon Unicar Co., Ltd.), and KBM303, KBM403, and KBM42 (Shin-Etsu Chemical Co., Ltd.)]. These aliphatic epoxy compounds may be used alone or as a mixture of two or more thereof.

The alicyclic epoxy compounds are not particularly limited. The alicyclic epoxy compounds refer to compounds having an alicyclic ring and at least one epoxy group bonded to the alicyclic ring in the molecule. Specific examples of the alicyclic epoxy compounds may include vinylcyclohexene monoxide 1,2-epoxy-4-vinylcyclohexane, 1,2:8,9 diepoxylimonene, 3,4-epoxycyclohexenylmethyl-3',4'-epoxycyclohexane carboxylate, limonene dioxide, di(3,4-epoxycyclohexyl)adipate, (3,4-epoxycyclohexyl)methyl-3,4-epoxycyclohexane carboxylate, (3,4-epoxy-6-methylcyclohexyl)methyl-3,4-epoxy-6-methylcyclohexane carboxylate, ethylene-1,2-di(3,4-epoxycyclohexanecarboxylic acid)ester, bis(3,4-epoxycyclohexylmethyl)adipate, bis(3,4-epoxy-6-methylcyclohexylmethyl)adipate, diethylene glycol bis(3,4-epoxycyclohexyl methyl ether), ethylene glycol bis(3,4-epoxycyclohexyl methyl ether), 2,3,14,15-diepoxy-7,11,18,21-tetraoxatrispiro-[5.2.2.5.2.2]hene-icosane(3,4-epoxycyclohexanespiro-2'6'-dioxanespiro-3"5"-dioxanespiro-3"',4"'-epoxycyclohexane), 4-(3,4-epoxycyclohexyl)-2,6-dioxa-8,9-epoxyspiro[5.5]undecane, 4-vinylcyclohexene dioxide, bis-2,3-epoxycyclopentyl ether, and dicyclopentadiene dioxide. Of these, 3,4-epoxycyclohexylmethyl-3,4-epoxycyclohexane carboxylate, 3,4-epoxycyclohexylmethyl alcohol, and 3,4-epoxycyclohexylethyltrimethoxysilane are preferred.

The alicyclic epoxy compounds may be synthesized or may be commercially available. Examples of commercially available products for the alicyclic epoxy compounds may include "CELLOXIDE 2000" (vinylcyclohexenemonoxide 1,2-epoxy-4-vinylcyclohexane), "CELLOXIDE 3000" (1,2:8,9 diepoxylimonene), and "CELLOXIDE 2021P" (3,4-epoxycyclohexenylmethyl-3',4'-epoxycyclohexene carboxylate) produced by Daicel Chemical Industries Co., Ltd. These alicyclic epoxy compounds may be used alone or as a mixture of two or more thereof.

Oxetane refers to a compound having a four-membered cyclic ether, i.e. an oxetane ring, in the molecule. The oxetane compounds used in the embodiments are not specifically limited. For example, the oxetane compounds may be those described in Paragraphs "0031"-"0100" of Japanese Patent Publication No. 2008-45081 A, which is incorporated by reference herein in its entirety for all purposes. More specific examples of the oxetane compounds may include 3-ethyl-3-hydroxymethyloxetane, 1,4-bis[{(3-ethyl-3-oxetanyl)methoxy}methyl]benzene(xylylene bisoxetane), 3-ethyl-3-(phenoxymethyl)oxetane, bis(3-ethyl-3-oxetanylmethyl)ether, 2-ethylhexyloxetane, 3-ethyl-3-(2-ethylhexyloxymethyl)oxetane), 3-ethyl-[{(3-triethoxysilylpropoxy)methyl)oxetane, oxetanyl silsesquioxane, and phenol novolac oxetane. Oxetanyl silsesquioxane refers to a silane compound having oxetanyl groups, e.g., a network type polysiloxane compound having oxetanyl groups obtained by hydrolysis and condensation of 3-ethyl-3-[{(3-triethoxysilyl)propoxy}methyl]oxetane described above. Of these, 3-ethyl-3-hydroxymethyloxetane, bis(3-ethyl-3-oxetanylmethyl)ether, and 3-ethyl-3-(2-ethylhexyloxymethyl)oxetane are preferred.

The oxetane compounds may be synthesized or may be commercially available. Examples of commercially available products for the oxetane compounds may include "ARON OXETANE OXT-101" (3-ethyl-3-hydroxymethyloxetane), "ARON OXETANE OXT-121" (xylylene bisoxetane), "ARON OXETANE OXT-211" (3-ethyl-3-(phenoxymethyl)oxetane)," "ARON OXETANE OXT-221" (di[1-ethyl(3-oxetanyl)]methyl ether), and "ARON OXETANE OXT-212" (2-ethylhexyloxetane), all of which are produced by Toagosei Co., Ltd. These oxetane compounds may be used alone or as a mixture of two or more thereof.

Vinyl ether refers to a compound having a vinyl ether group in the molecule. The vinyl ether compounds used in the embodiments are not particularly limited, and specific examples thereof may include ethyl vinyl ether, propyl vinyl ether, isopropyl vinyl ether, butyl vinyl ether, isobutyl vinyl ether, tert-butyl vinyl ether, amyl vinyl ether, 2-ethylhexyl vinyl ether, dodecyl vinyl ether, octadecyl vinyl ether, cyclohexyl vinyl ether, ethylene glycol monovinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, polyethylene glycol divinyl ether, ethylene glycol butyl vinyl ether, triethylene glycol methyl vinyl ether, polyethylene glycol methyl vinyl ether, butanediol monovinyl ether, butanediol divinyl ether, hexanediol monovinyl ether, hexanediol divinyl ether, cyclohexanedimethanol monovinyl ether, cyclohexanedimethanol divinyl ether, trimethylolpropane trivinyl ether, aminopropyl vinyl ether, diethylaminoethyl vinyl ether, polytetrahydrofuran divinyl ether, 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 3-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 5-vinyloxypentyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxy)ethyl(meth)acrylate, 2-(vinyloxyisopropoxyethoxy)ethyl(meth)acrylate, 2-(vinyloxyisopropoxyethoxyethoxy)ethyl(meth)acrylate, 2-(vinyloxyisopropoxyethoxyethoxyethoxy)ethyl(meth)acrylate, 2-(vinyloxyisopropoxyethoxyethoxyethoxyethoxy)ethyl(meth)acrylate, polyethylene glycol monovinyl ether (meth)acrylate, and polypropylene glycol monovinyl ether (meth)acrylate. Of these, cyclohexyl vinyl ether, triethylene glycol divinyl ether, and 2-(vinyloxyethoxy)ethyl(meth)acrylate are preferred.

The vinyl ether compounds may be synthesized or may be commercially available. Examples of commercially available products for the vinyl ether compounds may include "DVE-3" (triethylene glycol divinyl ether) and "CHVE" (cyclohexyl vinyl ether) produced by BASF Japan Co., Ltd., and "VEEA" (2-(vinyloxyethoxy)ethyl acrylate) produced by Nippon Shokubai Co., Ltd. These vinyl ether compounds may be used alone or as a mixture of two or more thereof.

The compound may include one of the aliphatic epoxy, the alicyclic epoxy, the oxetane, and the vinyl ether compounds. In an implementation, the compound may include a mixture of two or more compounds of the aliphatic epoxy, the alicyclic epoxy, the oxetane, and the vinyl ether compounds (in an appropriate ratio).

The compound may be present in an amount of about 75 to about 99.8 parts by weight, and preferably about 92 to about 98.5 parts by weight, based on a total weight of the adhesive composition. Maintaining the amount of the compound within this range may help ensure that the adhesive composition exhibits good curability upon light irradiation and that the adhesive composition may be used to form an adhesive layer with good adhesiveness and durability.

The titanate coupling agent may be included in the composition to significantly improve the durability thereof, particularly under high temperature and high humidity conditions, while maintaining good adhesiveness.

Any suitable titanate coupling agent may be used in the composition of an embodiment without any particular limitation.

For example, the titanate coupling agent may include a compound represented by Formula (1):

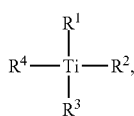
(1)

a dimer of the compound of Formula (1), and/or a coordination compound of the compound of Formula (1) with the phosphate compounds illustrated below:

HO—P—(OC$_8$H$_{17}$)$_2$ or HO—P—(OC$_{13}$H$_{27}$)$_2$.

In Formula (1), R$^1$, R$^2$, R$^3$, and R$^4$ may each independently be a group including one of

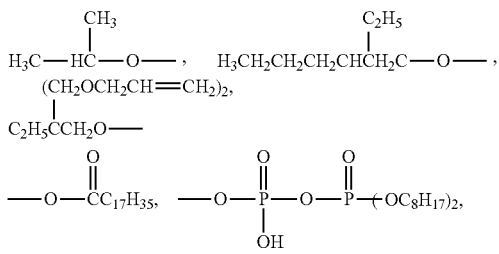

Two of R$^1$, R$^2$, R$^3$, and R$^4$ may be connected to form a ring structure including one of.

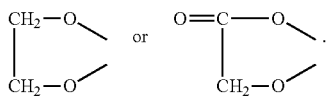

Specific examples of such structures may include PLENACT KR 138S and PLENACT KR 238S produced by Ajinomoto Fine Techno Co., Inc.:

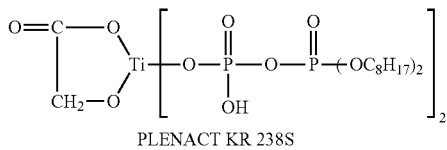
PLENACT KR 238S

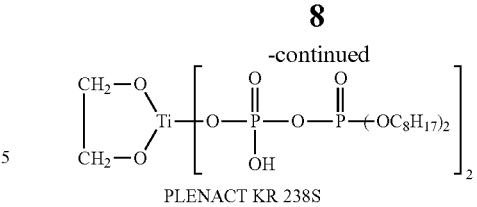
PLENACT KR 238S

The titanate coupling agent of Formula (1) may include PLENACT series commercially available from Ajinomoto Fine Techno Co., Inc., e.g., PLENACT KR TTS (isopropyl triisostearoyl titanate), PLENACT KR 38S (isopropyltris(dioctylpyrophosphate)titanate), PLENACT KR 138S (bis(dioctylpyrophosphate)oxyacetate titanate), PLENACT KR 238S (tris(dioctylpyrophosphate)ethylene titanate), PLENACT KR 338X (isopropyldioctylpyrophosphate titanate) and PLENACT KR 9SA (isopropyltris(dodecylbenzenesulfonyl)titanate); and ORGATICS series commercially available from Matsumoto Fine Chemical Co., Ltd., for example, ORGATICS TA-25 [titanium tetra-n-butoxide (Ti(O-n-C4H9)4)] and ORGATICS TA-30 [titanium tetra-2-ethylhexoxide (Ti(OC8H17)4)].

As described above, the titanate coupling agent may be a dimer of the compound of Formula (1). The dimer may include, e.g., ORGATICS TA-22 [titanium tetrabutoxide dimer ((n-C4H9O)3Ti—O—Ti(O-n-C4H9)3)] available from Matsumoto Fine Chemical Co., Ltd.

As described above, the titanate coupling agent may be a coordination compound of the compound of Formula (1) with one of the phosphites illustrated below:

HO—P—(OC$_8$H$_{17}$)$_2$ or HO—P—(OC$_{13}$H$_{27}$)$_2$.

Examples of such coordination compounds may include PLENACT KR 41B (tetraisopropylbis(dioctylphosphite)titanate), PLENACT KR 46B (tetraoctylbis(ditridecylphosphite)titanate), and PLENACT KR 55 (tetra(2,2-diallyloxymethyl-1-butyl)bis(ditridecyl)phosphite titanate), all of which are available from Ajinomoto Fine Techno Co., Inc.

Of these, PLENACT KR TTS, PLENACT KR KR 138S, PLENACT KR KR 9SA, ORGATICS TA-25, and ORGATICS TA-22 are preferred, PLENACT KR TTS, PLENACT KR 138S, PLENACT KR 9SA, and ORGATICS TA-25 are more preferred, and ORGATICS TA-25 is particularly preferred. These titanate coupling agents may be used alone or as a mixture of two or more thereof.

The titanate coupling agent may be present in an amount of about 0.1 to about 5 parts by weight, e.g., about 0.5 to about 3 parts by weight, based on a sum of weights (100 parts by weight) of the compound, the titanate coupling agent, and the photopolymerization initiator. Maintaining the amount of the titanate coupling agent within this range may help ensure that the adhesive composition exhibits good adhesiveness and durability, particularly under high temperature and high humidity conditions. For example, maintaining the amount of the titanate coupling agent at about 0.1 parts by weight or greater may help ensure that sufficient adhesiveness and durability are exhibited. Maintaining the amount of the titanate coupling agent at about 5 parts by weight or less may help prevent a deterioration in compatibility of the adhesive composition, thereby helping ensure sufficient adhesiveness.

The photopolymerization initiator may facilitate curing of the adhesive composition at room temperature. Thus, using the adhesive composition of an embodiment in the production of a polarizing plate may reduce the need to consider the heat resistance and the swelling deformation of a polarizer and may help ensure good adhesion of a protective film to the polarizer is facilitated. The photocationic polymerization initiator may act as a catalyst by light irradiation. Thus, good storage stability and workability of the adhesive composition may be ensured even when mixed with an epoxy compound.

Examples of compounds that generate cationic species or a Lewis acid by active energy ray may include onium salts, such as aromatic diazonium salts, aromatic iodonium salts, and aromatic sulfonium salts, as well as iron-arene complexes. Of these, aromatic sulfonium salts are particularly preferred because they have the ability to absorb UV light even in the wavelength range of 300 nm or above (indicating high curability) and may impart good mechanical strength and adhesive strength to a cured product.

There is no particular restriction as to the kind of the photopolymerization initiator. The photopolymerization initiator (that generate cationic species or a Lewis acid by an active energy ray, e.g., visible light, ultraviolet light, X-ray and electron beam, to initiate the polymerization of epoxy, oxetane, or vinyl groups) may include hexafluoroantimonate salts, pentafluorohydroxyantimonate salts, hexafluorophosphate salts, hexafluoroarsenate salts, and other cationic polymerization initiators, represented by Formulae (a) to (e), below.

  (a)

  (b)

In Formulae (a) and (b), each Ar may represent an aryl group, e.g., a phenyl group, and $X_1^-$ may represent $BF_4^-$:, $PF_6^-$, $SbF_6^-$ or $AsF_6^-$.

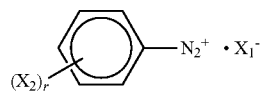  (c)

In Formula (c), $X_1^-$ may represent $PF_6^-$, $SbF_6^-$, or $AsF_6^-$, $X_2$ may represent a $C_1$-$C_{12}$ alkyl or $C_1$-$C_{12}$ alkoxy group, and r may be an integer from 0 to 3.

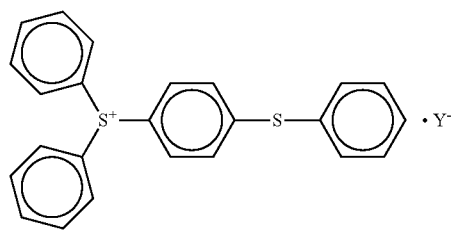  (d)

In Formula (d), $Y^-$ may represent $PF_6^-$, $SbF_6^-$, $AsF_6^-$, or $SbF_5(OH)^-$.

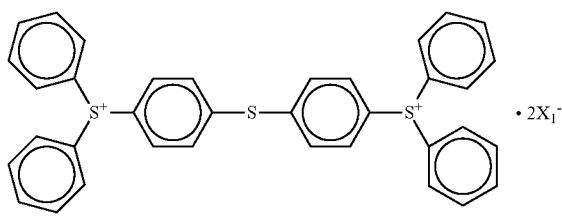  (e)

In Formula (e), $X_1^-$ may represent $PF_6^-$, $SbF_6^-$, or $AsF_6^-$.

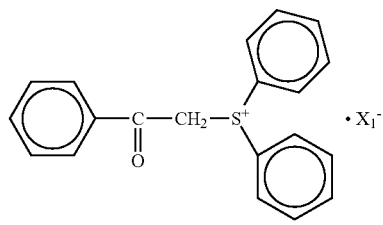  (f)

In Formula (f), $X_1^-$ may represent $PF_6^-$, $SbF_6^-$, or $AsF_6^-$.

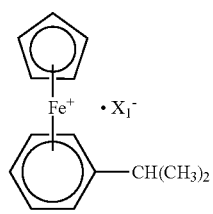  (g)

In Formula (g), $X_1^-$ may represent $PF_6^-$, $SbF_6^-$, or $AsF_6^-$.

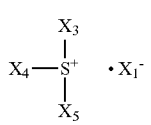  (h)

In Formula (h), $X_1^-$ may represent $PF_6^-$, $SbF_6^-$, or $AsF_6^-$, $X_3$ may represent a $C_1$-$C_7$ hydrocarbon or hydroxyphenyl group, $X_4$ may represent a $C_7$-$C_{15}$ aralkyl or $C_3$-$C_9$ alkenyl group, and $X_5$ may represent a $C_1$-$C_5$ alkyl group. In an implementation, $X_5$ may contain an oxygen or sulfur atom.

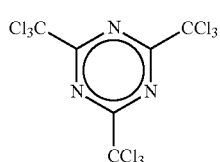  (i)

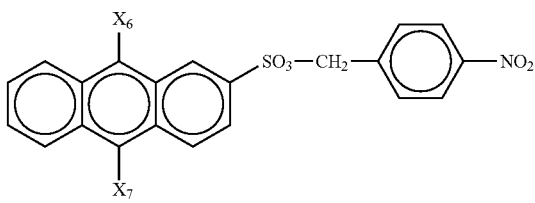  (j)

In Formulae (i) and (j), $X_6$ and $X_7$ may each independently be a $C_1$-$C_{12}$ alkyl or $C_1$-$C_{12}$ alkoxy group.

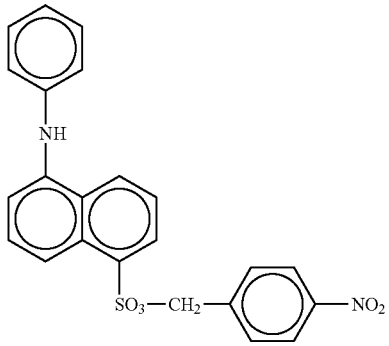

(k)

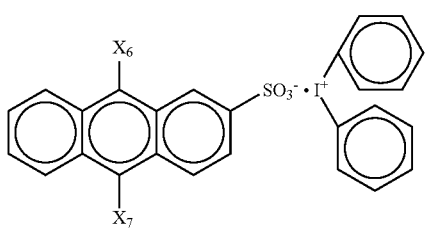

(l)

In Formulae (k) and (l), $X_6$ and $X_7$ may each independently be a $C_1$-$C_{12}$ alkyl group or a $C_1$-$C_{12}$ alkoxy group.

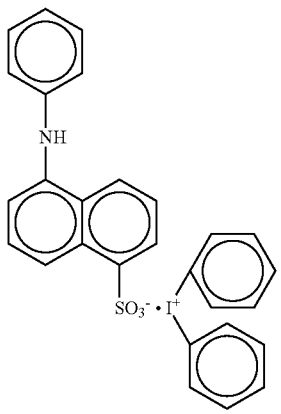

(m)

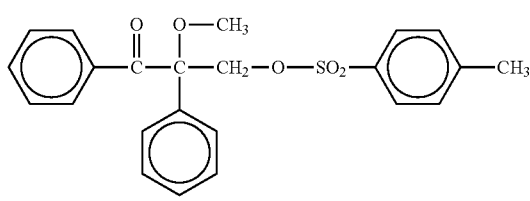

(n)

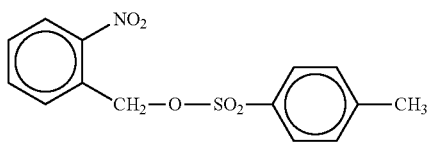

(o)

Among these photopolymerization initiators, sulfonium salts and iodonium salts are preferred.

Examples of suitable sulfonium salts may include triphenylsulfonium hexafluorophosphate, triphenylsulfonium hexafluoroantimonate, triphenylsulfonium tetrakis(pentafluorophenyl)borate, 4,4'-bis[diphenylsulfonio]diphenylsulfide bishexafluorophosphate, 4,4'-bis[di((β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenylsulfide hexafluoroantimonate, and 4-(p-tert-butylphenylcarbonyl)-4'-di(p-toluyl)sulfonio-diphenylsulfide tetrakis(pentafluorophenyl)borate.

Examples of suitable iodonium salts may include diphenyliodonium tetrakis(pentafluorophenyl)borate, diphenyliodonium hexafluorophosphate, diphenyliodonium hexafluoroantimonate, bis(dodecylphenyl)iodonium hexafluoroantimonate, and di(4-nonylphenyl)iodonium hexafluorophosphate.

The photopolymerization initiator may be synthesized or may be commercially available. Examples of commercially available products for the photopolymerization initiator may include: "KAYARAD PCI-220" and "KAYARAD PCI-620" produced by Nippon Kayaku Co., Ltd.; "UVI-6990" produced by Union Carbide Corporation; "ADEKA OPTOMER SP-150" and "ADEKA OPTOMER SP-170" produced by Adeka Co., Ltd.; "CI-5102," "CIT-1370," "CIT-1682," "CIP-1866S," "CIP-2048S," and "CIP-2064S" produced by Nippon Soda Co., Ltd.); "DPI-101," "DPI-102," "DPI-103," "DPI-105," "MPI-103," "MPI-105," "BBI-101," "BBI-102," "BBI-103," "BBI-105," "TPS-101," "TPS-102," "TPS-103," "TPS-105," "MDS-103," "MDS-105," "DTS-102," and "DTS-103" produced by Midori Kagaku Co., Ltd.; "PI-2074" produced by Rhodia Co.; Irgacure 250 (A: iodonium, (4-methylphenyl)[4-(2-methylpropyl)phenyl]-hexafluorophosphate(1-), B: propylene carbonate), and Irgacure 264 produced by Ciba Japan Co., Ltd.; UV9380C (bis(dodecylphenyl)iodonium hexafluoroantimonate) produced by GE Toshiba Silicones Co., Ltd.; UVACURE1591 produced by Daicel UCB; Cyracure UVI-6970, UVI-6974, and UVI-6990 produced by Union Carbide Corporation (U.S.A.); and SI-60L and SI-100L produced by Sanshin Chem. Ind. Ltd.

These photopolymerization initiators may be used alone or as a mixture of two or more thereof.

The photopolymerization initiator may be present in an amount of about 0.1 to about 20 parts by weight, e.g., about 1 to about 5 parts by weight, based on 100 parts by weight of the compound, the titanate coupling agent, and the photopolymerization initiator. Maintaining the amount of the photopolymerization initiator within this range may help ensure that the adhesive composition exhibits good polymerizability (curability) when irradiated with light. The sum of the weights of the components (a), (b) and (c) may be 100 parts by weight.

The photocationically polymerizable adhesive composition of an embodiment may further include a photosensitizer. The photosensitizer may bring about an improvement in reactivity and may improve mechanical strength and adhesive strength of a cured product. The photosensitizer may be added for the purpose of further improving the curability of the adhesive composition upon UV irradiation. There is no particular restriction as to the kind of the photosensitizer. Examples of suitable photosensitizers may include carbonyl compounds, organosulfur compounds, persulfides, redox compounds, azo compounds, diazo compounds, halogen compounds, and photoreductive colorants. Other photosensitizers may include: benzoin derivatives, e.g., benzoin methyl ether, benzoin isopropyl ether, and α,α-dimethoxy-α-phenylacetophenone; benzophenone derivatives, e.g., benzophenone, 2,4-dichlorobenzophenone, methyl o-benzoyl benzoate, and 4,4'-bis(diethylamino)benzophenone; thioxanthone derivatives, e.g., thioxanthone, 2-chlorothioxanthone, and 2-isopropylthioxanthone; anthraquinone derivatives, e.g., 2-chloroanthraquinone and 2-methylanthraquinone; acridone derivatives, e.g., N-methylacridone and N-butylacridone; pyrene; perylene; acridine orange; benzoflavine; α,α-diethoxyacetophenone; benzyl compounds; fluorenone; xanthone; uranyl compounds; halogen compounds; and photoreductive colorants. These photosensitizers may be used alone or as a mixture of two or more thereof.

The photosensitizer may be synthesized or may be commercially available. An example of a commercially available product for the photosensitizer is "Kayacure DETX-S" produced by Nippon Kayaku Co., Ltd. There is no particular restriction as to the amount of the photosensitizer used so long as the aforementioned effects are obtained. For example, the photosensitizer may be present in an amount of about 0.1 to about 10 parts by weight, based on 100 parts by weight of the compound, the titanate coupling agent, and the photopolymerization initiator.

In addition to or instead of the photosensitizer, the photocationically polymerizable adhesive composition of an embodiment may further include at least one inert component. The inert component may include at least one of inorganic fillers, softeners, antioxidants, anti-aging agents, stabilizers, tackifier resins, modified resins (e.g., polyol resins, phenolic resins, acrylic resins, polyester resins, polyolefin resins, epoxy resins and epoxidated polybutadiene resins), leveling agents, defoaming agents, plasticizers, dyes, pigments (e.g., coloring pigments and extender pigments), processing agents, UV blocking agents, fluorescent whitening agents, dispersants, heat stabilizers, light stabilizers, UV absorbers, antistatic agents, lubricants, and solvents. The antioxidants may include, e.g., dibutylhydroxytoluene (BHT); and Irganox 1010, Irganox 1035FF, and Irganox 565 (all of which are produced by Ciba Japan Co., Ltd.). The tackifier resins may include, e.g., rosins, such as rosin acid, polymerized rosin acid and rosin acid ester, terpene resins, terpene phenolic resins, aromatic hydrocarbon resins, aliphatic saturated hydrocarbon resins, and petroleum resins. There is no particular restriction as to the amount of the inert component used. For example, the inert component may be included in an amount of about 0.1 to about 20 parts by weight, based on 100 parts by weight of the compound, the titanate coupling agent, and the photopolymerization initiator.

The photocationically polymerizable adhesive composition of an embodiment may be cured rapidly and efficiently through photopolymerization when irradiated with UV light at a low dose in the presence of the photopolymerization initiator. Accordingly, the photocationically polymerizable adhesive composition of an embodiment may be used for adhesion of various bases, e.g., plastics, papers and metals. The photocationically polymerizable adhesive composition of an embodiment may be useful in adhesion between thin films, e.g., PET film/PET film, TAC film/COP film, TAC film/TAC film, and COP film/COP film, between different materials, e.g., inorganic materials (e.g., glass) and resins (e.g., PET and acetyl cellulose) and their thin films, and between metallic materials (e.g., aluminum) and resins (e.g., PET) and their thin films. The photocationically polymerizable adhesive composition of an embodiment may be used by known methods. For example, the photocationically polymerizable adhesive composition may be applied to a base and irradiated with an active energy ray. In addition, the photocationically polymerizable adhesive composition of an embodiment may be highly durable. Accordingly, the photocationically polymerizable adhesive composition of an embodiment may be suitable for use in optical members having various optical sheets.

Thus, the embodiments provide an optical member including an optical sheet wherein the photocationically polymerizable adhesive composition is applied to at least one side of the optical sheet.

The optical member may be a polarizing plate or a laminate including optical layers exhibiting different optical functions, e.g., an optical film for a liquid crystal display. The use of the adhesive composition according to an embodiment may help ensure good adhesion between a polarizer and a protective film. Thus, the adhesive composition of an embodiment may be particularly suited to use for adhesion between a polarizer and a protective film of a polarizing plate.

Hereinafter, an explanation will be given of embodiments for using the adhesive composition for adhesion between a polarizer and a protective film. The embodiments are not limited to the following descriptions and it is to be understood that the adhesive composition of an embodiment may be used for the adhesion of other members.

A polarizing plate may be produced by adhering a protective layer (or a (protective film)) to one side of a polarizer through the photocationically curable adhesive and curing the adhesive to fix the protective layer to the polarizer. For example, the polarizing plate may be a laminate including the polarizer and the protective layer. The polarizer may be produced by casting polyvinyl alcohol to form a film, adsorbing iodine or a dichroic dye to the film, and stretching the film in a boric acid solution.

The adhesive composition of an embodiment may be prepared by homogenizing components thereof with stirring. For example, the components may be mixed and stirred using suitable methods and tools (e.g., a dissolver), for example, for about 10 minutes until the mixture becomes homogeneous. If desired, the mixture may be heated, e.g., to about 50° C., before or during stirring.

The polarizer may be imparted with polarization characteristics by adsorbing a dichroic colorant to a polyvinyl alcohol resin film and aligning the dichroic colorant. Iodine or a dichroic organic dye may be used as the dichroic colorant. The polarizer may include an iodine polarizing film in which iodine is adsorbed to a polyvinyl alcohol resin film and is aligned or a dye polarizing film in which a dichroic organic dye is adsorbed to a polyvinyl alcohol resin film and is aligned.

The polyvinyl alcohol resin may be produced by saponification of a polyvinyl acetate resin. The polyvinyl acetate resin may include polyvinyl acetate, a homopolymer of vinyl acetate, or a copolymer of vinyl acetate and a monomer copolymerizable with the vinyl acetate. Examples of suitable monomers copolymerizable with vinyl acetate may include unsaturated carboxylic acids, olefins, vinyl ethers, and unsaturated sulfonic acids. The polyvinyl alcohol resin may be unmodified or modified, e.g., polyvinyl formal, polyvinyl acetal, or polyvinyl butyral modified with an aldehyde.

The protective layer may be formed of any suitable material. Examples of materials suitable for constituting the protective layer may include polycarbonate resins, polyether sulfone resins, polyethylene terephthalate resins, polyimide resins, polymethyl methacrylate resins, polysulfone resins, polyarylate resins, polyethylene resins, polyvinyl chloride resins, diacetyl cellulose, triacetyl cellulose (TAC), polyester resins, acrylic resins, amorphous polyolefin resins, and alicyclic olefin polymers. The alicyclic olefin polymers may be cyclic olefin random multinary copolymer described in Japanese Unexamined Patent Publication No. Hei 05-310845, which is incorporated by reference herein in its entirety for all purposes, hydrogenated polymers described in Japanese Unexamined Patent Publication No. Hei 05-97978, which is incorporated by reference herein in its entirety for all purposes, and thermoplastic dicyclopentadiene ring-opened polymers and their hydrogenated products described in Japanese Unexamined Patent Publication No. Hei 11-124429, which is incorporated by reference herein in its entirety for all purposes.

When the adhesive composition of an embodiment is used in the production of a polarizing plate, it is preferred to treat, by corona discharge, one surface of a protective layer bonded to a polarizer. This corona discharge treatment may improve adhesion between the protective layer and the polarizer. The corona discharge treatment may refer to a process in which a high voltage is applied between electrodes to activate a resin film between the electrodes. The effects of the corona discharge treatment may vary depending on the kind of the electrodes, the interval between the electrodes, the voltage, humidity, and the kind of the resin film. It is preferred to set the interval between the electrodes to about 1 to about 5 mm and a moving speed to about 3 to about 20 m/min. After the corona discharge treatment, the polarizer may be adhered to the treated surface of the protective layer through the adhesive composition of an embodiment.

The embodiments are not limited to the above materials; and the adhesive composition of an embodiment may be applied with good adhesiveness to other bases. Examples of bases usable herein may include plastic films, papers, and metal foils. Suitable plastic films may include those through which active energy rays may be transmitted. A thickness of the plastic films may be selected depending on thin film adherends and the intended applications. A preferred thickness of the plastic films is about 0.2 mm or below. The plastic films may include, e.g., polyvinyl chloride resins, polyvinylidene chloride, cellulosic resins, acrylic resins, cyclic olefin resins, amorphous polyolefin resins, polyethylene, polypropylene, polystyrene, ABS resins, polyamide, polyester, polycarbonate, polyurethane, polyvinyl alcohol, ethylene-vinyl acetate copolymers, and chlorinated polypropylene. The amorphous polyolefin resins may include those having norbornene or cyclic polyolefin monomers, e.g., polycyclic norbornene, as repeating units. The amorphous polyolefin resins may be copolymers of cyclic olefins and linear or branched cyclic olefins. Commercially available products for the amorphous polyolefin resins may include, e.g., ARTON (JSR Corp.), ZEONEX and ZEONOR (Nippon Zeon Corp.), and APO and APEL (Mitsui Chemical Inc.). The amorphous polyolefin resins may be produced into films by suitable known methods, e.g., solvent casting and melt extrusion. The paper may include, e.g., simili paper, woodfree paper, kraft paper, art coated paper, cast-coated paper, white roll paper, parchment paper, waterproof paper, glassine paper and corrugated paper. The metal foils may include, e.g., aluminum foils.

The adhesive composition of an embodiment may be coated by known coaters, including a natural coater, a knife belt coater, a floating knife, a knife-over-roll, a knife-on-blanket, a spray coater, a dipping coater, a kiss roll, a squeeze roll, a reverse roll, an air blade, a curtain flow coater, a doctor blade, a wire bar, a die coater, a comma coater and a gravure coater. A coating thickness of the composition according to an embodiment may be selected depending on thin film adherends and the intended applications. The composition of an embodiment is preferably coated to a thickness of about 0.5 to about 10 μm, e.g., about 1 to about 5 μm.

There is no particular restriction as to a viscosity of the adhesive composition for coating. In view of ease of coating, the viscosity of the adhesive composition may be adjusted to about 200 mPa·s or below (25° C.), and preferably about 100 mPa·s or below (25° C.). Adhesive compositions may be easier to coat and may be coated to a smaller thickness at lower viscosity. For example, an adhesive composition having a low viscosity may be used to attach a protective film or an optical compensation film to a polarizing plate, thereby ensuring a good appearance of the final polarizing plate. Accordingly, the use of an adhesive composition having a low viscosity is preferred. A highly viscous adhesive composition may be used in a small amount.

The photocationically curable adhesive may be cured by light irradiation. For example, the photocationically curable adhesive may be applied to a base and may then be irradiated with an active energy ray. The active energy ray may include UV light, X-ray, and/or an electron beam. UV light is preferred due to the low costs associated with generation systems thereof. Various UV light sources may be used, e.g., metal halide lamps, xenon lamps, pressurization and high-pressure mercury lamps, ultrahigh-pressure mercury lamps, electrodeless discharge lamps, carbon arc lamps, solar light, and other light sources emitting light having a wavelength distribution from about 200 to about 600 nm, e.g., from about 450 to about 300 nm. The adhesive may be cured using various electron beam generators, e.g., Cockcroft-Walton's generators, Van de Graff generators, and resonant transformers. An electron beam having an energy of about 50 to about 1,000 eV is preferred. An electron beam having an energy of about 100 to about 300 eV is more preferred. The light irradiation conditions are not particularly limited. For example, the coating may be irradiated with light at a dose ranging from about 10 to about 1,000 mJ/cm$^2$, e.g., from about 50 to about 500 mJ/cm$^2$.

After UV irradiation, the adhesive may be heated, if desired. This heating may remove or reduce unreacted components of the adhesive and uncured portions of the coating after UV irradiation, and may protect the coating from deformation during subsequent molding. In an implementation, the heating may improve the hardness and adhesiveness of the adhesive. The adhesive may be heated at a temperature of about 150 to about 200° C. for about 1 to about 30 minutes.

A laminate film or sheet produced using the adhesive composition of an embodiment may be suitably used in polarizing films plates and retardation films for various displays, e.g., liquid crystal displays, due to high adhesive strength under high temperature and high humidity conditions.

The adhesive composition of an embodiment may exhibit good adhesion to a variety of bases. In addition, the adhesive composition of an embodiment may be favorable in terms of environmental protection, safety, and hygiene because there may be no need to use an organic solvent. The adhesive may be formed into a thin film (several μm thick) due to its low viscosity. UV curing of the adhesive may avoid the need for thermal processing. Thus, a film formation line may be installed in a small space.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Materials used in the Examples and Comparative Examples are shown in Table 1.

TABLE 1

| Trade Name | Compound name |
|---|---|
| EPOLITE 100MF (Kyoeisya Chemical Co., Ltd.) | Trimethylolpropane triglycidyl ether |
| DENACOL EX-321L (Nagase ChemteX Corporation) | Trimethylolpropane polyglycidyl ether |
| EPIKOTE 828 (Japan Epoxy Resins Co., Ltd.) | Bisphenol A diglycidyl ether |
| CELLOXIDE 2000 (Daicel Chemical Industries Co., Ltd.) | Vinylcyclohexene monoxide (1,2-Epoxy-4-vinylcyclohexane) |
| CELLOXIDE 3000 (Daicel Chemical Industries Co., Ltd.) | 1,2:8,9 Diepoxylimonene |
| CELLOXIDE 2021P (Daicel Chemical Industries Co., Ltd.) | 3,4-Epoxycyclohexenylmethyl-3',4'-epoxycyclohexene carboxylate |
| ARON OXETANE OXT-212 (Toagosei Co., Ltd) | 2-Ethylhexyloxetane |
| ARON OXETANE OXT-121 (Toagosei Co., Ltd) | Xylylene bisoxetane |
| DVE-3 (BASF Japan Co., Ltd.) | Triethylene glycol divinyl ether |
| CHVE (BASF Japan Co., Ltd.) | Cyclohexyl vinyl ether |
| VEEA (Nippon Shokubai Co., Ltd) | 2-(2-Vinyloxyethoxy)ethyl acrylate |
| Irgacure 250 (Ciba Japan Co., Ltd.) | A: Iodonium, (4-methylphenyl)[4-(2-methylpropyl)phenyl]-hexafluorophosphate (1-) B: Propylene carbonate (A:B = 3:1 mixture) |
| PI-2074 (Rhodia Co.) | Diaryl iodonium |
| UV9380C (GE Toshiba Silicones Co., Ltd.) | Bis(dodecylphenyl)iodonium hexafluoroantimonate |
| PLENACT KR TTS (Ajinomoto Fine Techno Co., Inc) | Isopropyl triisostearoyl titanate |
| PLENACT KR 9SA (Ajinomoto Fine Techno. Co., Inc.) | Isopropyltris(dodecylbenzenesulfonyl)titanate |
| PLENACT KR 41B (Ajinomoto Fine Techno. Co., Inc.) | Tetraisopropylbis(dioctylphosphite)titanate |
| ORGATICS TA-25 (Matsumoto Fine Chemical Co., Ltd.) | Titanium tetra-n-butoxide (Ti(O-n-$C_4H_9$)$_4$) |

Example 1

70 Parts by weight of EPOLITE 100MF (Kyoeisya Chemical Co., Ltd.) as an aliphatic epoxy compound, 25 parts by weight of CELLOXIDE 2000 (Daicel Chemical Industries Co., Ltd.) as an alicyclic epoxy compound, 4 parts by weight of Irgacure 250 (Ciba Japan Co., Ltd.) as a photopolymerization initiator, and 1 part by weight of PLENACT KR TTS (Ajinomoto Fine Techno. Co., Inc.) as a titanate coupling agent were stirred in a container until the mixture became homogeneous, to prepare a photocationically polymerizable adhesive composition (1).

Then, the adhesive composition (1) was applied to an 80 µm thick tridiacetyl cellulose (TAC) film and a 72 µm thick cyclic olefin resin film (COP film) using a wire bar so as to have thicknesses of 5 µm after cross-linking. A 25 µm thick polarizer was disposed between the applied surfaces of the films. The laminate was pressed using a roller and irradiated under a 365 nm metal halide lamp at an energy of 400 mJ/cm$^2$ to produce a polarizing plate (1).

The polarizing plate (1) was evaluated for adhesiveness, curability and durability by the following methods. The results are shown in Table 2.

Examples 2-8

Photocationically polymerizable adhesive compositions (2)-(8) were prepared in the same manner as in Example 1, except that the component (a), the titanate coupling agent, and the photopolymerization initiator were used in accordance with the compositions shown in Table 2.

Then, polarizing plates (2)-(8) were produced in the same manner as in Example 1, except that the photocationically polymerizable adhesive compositions (2)-(8) were used instead of the photocationically polymerizable adhesive composition (1).

The polarizing plates (2)-(8) were evaluated for adhesiveness, curability and durability by the methods described above. The results are shown in Table 2.

Comparative Examples 1-5

Photocationically polymerizable adhesive compositions (1)-(5) were prepared in the same manner as in Example 1, except that the component (a) and the photopolymerization initiator were used in accordance with the compositions shown in Table 3.

Then, polarizing plates (1)-(5) were produced in the same manner as in Example 1, except that the comparative adhesive compositions (1)-(5) were used instead of the adhesive composition (1).

The comparative polarizing plates (1)-(5) were evaluated for adhesiveness, curability and durability by the methods described above. The results are shown in Table 3.

Adhesiveness Test

Each of the polarizing plates produced in Examples 1-8 and Comparative Examples 1-5 was cut into a test piece having a width of 25 mm and a length of 100 mm. The TAC film and the COP film were pulled at a rate of 100 mm/min in opposite directions at 90° angles with respect to the laminate. Then, the peeled states of the test piece were observed.

In Tables 2 and 3, the symbol "○" indicates that the laminate was destroyed by the applied forces; and the symbol "×" indicates that the films were peeled off from the laminate.

Curability Test

Each of the photocationically polymerizable adhesive compositions prepared in Examples 1-8 and Comparative Examples 1-5 was applied to a 50 μm PET film using a wire bar so as to have a thickness of 5 μm after cross-linking. Another PET film was placed on the surface of the film to which the adhesive composition was applied. The laminate was pressed using a roller and irradiated with UV light under a 365 nm metal halide lamp at an energy of 400 mJ/cm². 30 min and 24 hr after irradiation, the surface states of the laminate were checked with a finger. In Tables 2 and 3, the symbol "○" indicates that no fingerprints were left on the applied surface, the symbol "Δ" indicates that fingerprints were left on the applied surface, and the symbol "×" indicates that the adhesive composition in the form of a solution remained unchanged without being cured.

Durability Test

After each of the polarizing plates produced in Examples 1-8 and Comparative Examples 1-5 was allowed to stand at 60° C. and 90% RH for 500 hr, the appearance of the polarizing plate was observed, In Tables 2 and 3, the symbol "○" indicates that no peeling was observed at the ends of the film, and the symbol "×" indicates that peeling occurred at the ends of the film.

Evaluation of Adhesiveness by Warm-Water Dipping Testing

Each of the polarizing plates produced in Examples 1-8 and Comparative Examples 1-5 was cut into a sample having a size of 30 mm×80 mm. The sample was dipped in a water bath at 60° C. for 3 hr. Thereafter, the sample was taken out of the water bath and the water was wiped off. After warm-water dipping, an observation was made as to whether iodine was eluted from portions of the polarizing plate in contact with the warm water around the polarizer and the initial color of the sample was maintained or lost. Before warm-water dipping, the color inherent to the polarizing plate was uniform over the entire surface of the sample. In Tables 2 and 3, the symbol "○" indicates that the sample was not decolored and the symbol "×" indicates that portions of the sample were decolored.

TABLE 2

| | | | Examples | | | | | | | |
|---|---|---|---|---|---|---|---|---|---|---|
| | | | 1 | 2 | 3 | 4 | 5 | 6 | 7 | 8 |
| Photocationically polymerizable adhesive composition | | | (1) | (2) | (3) | (4) | (5) | (6) | (7) | (8) |
| Composition | | | | | | | | | | |
| Component (a) | EPOLITE 100MF | | 70 | 82.9 | | | | | 9 | 54 |
| | DENACOL EX-321L | | | | 58 | | | | 46.5 | |
| | EPIKOTE 828 | | | | 1 | | | 5 | | |
| | CELLOXIDE 2000 | | 25 | | | 90 | | 77 | 20 | |
| | CELLOXIDE 3000 | | | 7 | | | 39 | | | 40 |
| | CELLOXIDE 2021P | | | | 35 | | | | 10 | |
| | ARON OXETANE OXT-212 | | | 7 | | | | | | 15 |
| | ARON OXETANE OXT-121 | | | | | | | 45 | | |
| | DVE-3 | | | | | 4 | | 2 | | |
| | CHVE | | | | | | 10 | | 3 | |
| | VEEA | | | | | | | 3 | | |
| Photopolymerization initiator | Irgacure 250 | | 4 | | | 2 | | | | 1 |
| | PI-2074 | | | 3 | | | | | 5 | |
| | UV9380C | | | | 4 | | 1 | 1 | | |
| Titanate coupling agent | PLENACT KR TTS | | 1 | | | | | 3 | | |
| | PLENACT KR 9SA | | | | 2 | | | | | 5 |
| | PLENACT KR 41B | | | | | 4 | | | 0.5 | |
| | ORGATICS TA-25 | | | 0.1 | | | 5 | | | |
| | Total (weight parts) | | 100 | 100 | 100 | 100 | 100 | 100 | 100 | 100 |
| Adhesiveness test | TAC/PVA | | ○ | ○ | ○ | ○ | ○ | ○ | ○ | ○ |
| | COP/PVA | | ○ | ○ | ○ | ○ | ○ | ○ | ○ | ○ |
| Curability test | 30 min after UV irradiation | | ○ | ○ | ○ | ○ | ○ | ○ | ○ | ○ |
| | 24 hr after UV irradiation | | ○ | ○ | ○ | ○ | ○ | ○ | ○ | ○ |
| Durability test | | | ○ | ○ | ○ | ○ | ○ | ○ | ○ | ○ |
| Warm-water dipping test | | | ○ | ○ | ○ | ○ | ○ | ○ | ○ | ○ |

TABLE 3

|  |  | Comparative Examples | | | | |
|---|---|---|---|---|---|---|
|  |  | 1 | 2 | 3 | 4 | 5 |
| Photocationically polymerizable adhesive composition | | (1) | (2) | (3) | (4) | (5) |
| Composition | | | | | | |
| Component (a) | EPOLITE 100MF | 71 | 82.95 | 50 | | |
|  | EPIKOTE 828 | | | 1 | | |
|  | CELLOXIDE 2000 | 25 | | | 93 | 39 |
|  | CELLOXIDE 2021P | | 6 | 37 | | |
|  | ARON OXETANE OXT-212 | | 9 | | | |
|  | ARON OXETANE OXT-121 | | | | | 43 |
|  | DVE-3 | | | | 5 | |
|  | CHVE | | | | | 10 |
| Photopolymerization initiator | Irgacure 250 | 4 | | | 2 | |
|  | UV9380C | | 2 | 4 | | 1 |
| Titanate coupling agent | PLENACT KR TTS | | 0.05 | | | 7 |
|  | PLENACT KR 9SA | | | 8 | | |
|  | Total (Weight parts) | 100 | 100 | 100 | 100 | 100 |
| Adhesiveness test | TAC/PVA | ○ | ○ | X | ○ | X |
|  | COP/PVA | ○ | ○ | X | ○ | X |
| Curability test | 30 min after UV irradiation | Δ | Δ | Δ | Δ | Δ |
|  | 24 hr after UV irradiation | ○ | ○ | ○ | ○ | ○ |
| Durability test | | X | X | X | X | X |
| Warm-water dipping test | | X | X | X | X | X |

As may be seen from the results in Tables 2 and 3, the optical members using the photocationically polymerizable adhesive compositions (1)-(8) exhibited better adhesiveness and durability than those using the comparative adhesive compositions (1) and (4) including no titanate coupling agent.

The photocationically polymerizable adhesive composition prepared in Comparative Example 2, which included a smaller amount of the titanate coupling agent, was inferior in terms of adhesiveness and durability when compared to the photocationically polymerizable adhesive compositions prepared in Examples 1-8.

The presence of a larger amount of the titanate coupling agent in the photocationically polymerizable adhesive compositions prepared in Comparative Examples 3 and 5 deteriorated the compatibility of the adhesive compositions. As a result, the comparative adhesive compositions showed poor adhesiveness when compared to the photocationically polymerizable adhesive compositions prepared in Examples 1-8.

By way of summation and review, UV curable adhesives may exhibit rapid curing and productivity improvement. UV curable adhesives may be suitable for adhesion of thermoplastic resins (which may undergo thermal deformation) because such adhesives may not require heat for curing. Thus, UV curable adhesives have been widely used as adhesives and sealing agents in optical members and electric/electronic members in which simple and rapid curing and adhesion are desired. UV curable adhesives may include, e.g., cationically polymerizable adhesives (including cationically polymerizable compounds having an epoxy group or a vinyl group and cationic polymerization initiators generating cations upon UV irradiation) and radically polymerizable adhesives (including radically polymerizable compounds having a radically polymerizable unsaturated group and radical polymerization initiators generating radicals upon UV irradiation).

A radically polymerizable adhesive composition may be inhibited from curing by the presence of oxygen, may undergo shrinkage upon curing, and may exhibit poor adhesion to metals and low heat resistance. Radically polymerizable adhesives may be relatively rapidly cured, but may have problems of poor adhesion to materials and insufficient processability. Further, radically polymerizable adhesives may exhibit poor surface curability because their curing may be inhibited by oxygen. Also, additional systems, such as a nitrogen filling system, may be needed.

Photocationically polymerizable adhesive compositions may have a low reaction rate and insufficient performance immediately after UV irradiation, compared to the radically polymerizable adhesive composition. Further, the photocationically polymerizable adhesive composition may require heating for curing. Further, a cured product of the photocationically polymerizable adhesive composition may be brittle owing to its high hardness. This brittleness may lead to poor adhesion and the formation of cracks, fissures and splits.

Accordingly, the embodiments provide an adhesive composition having good adhesiveness and durability.

The embodiments provide an adhesive composition that exhibits good adhesiveness and is highly durable under high temperature and high humidity conditions.

The addition of a titanate coupling agent may improve the adhesiveness and durability of an adhesive composition.

The adhesive composition of an embodiment may have good adhesiveness, particularly under high temperature and high humidity conditions, and may be highly durable. Therefore, the adhesive composition of an embodiment may be effective in adhering thin adherends, e.g., various plastic films, and may find suitable application in the production of optical films, particularly for liquid crystal displays.

The embodiments provide a photocationically polymerizable adhesive composition having good adhesiveness and durability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A photocationically polymerizable adhesive composition having a viscosity at 25° C. of about 200 mPa·s or less, comprising
   about 75 to about 99.8 parts by weight of a compound including one of aliphatic epoxy, alicyclic epoxy, oxetane, and vinyl ether compounds,
   about 0.1 to about 5 parts by weight of a titanate coupling agent, and
   about 0.1 to about 20 parts by weight of a photopolymerization initiator,
   wherein a sum of weights of the compound, the titanate coupling agent, and the photopolymerization initiator is 100 parts by weight.

2. The photocationically polymerizable adhesive composition as claimed in claim 1, wherein the titanate coupling agent is:
   a compound represented by Formula (1):

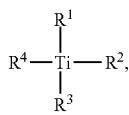

in Formula (1), $R^1$, $R^2$, $R^3$, and $R^4$ are each independently a group including one of

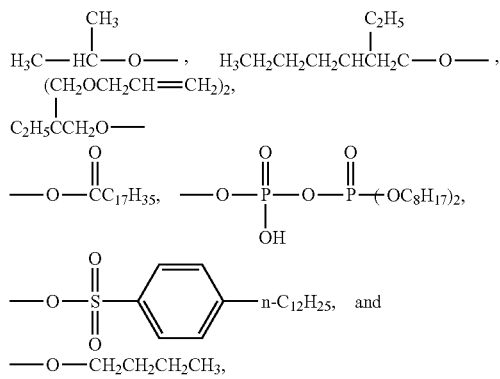

or two of $R^1$, $R^2$, $R^3$, and $R^4$ are connected to form a ring structure including one of

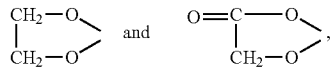

a dimer of the compound of Formula (1), or
   a coordination compound of the compound of Formula (1) with one of the phosphites, below:

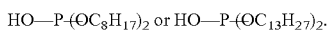

3. The photocationically polymerizable adhesive composition as claimed in claim 1, wherein the compound is included in an amount of about 92 to about 98.5 parts by weight.

4. The photocationically polymerizable adhesive composition as claimed in claim 1, wherein the titanate coupling agent is included in an amount of about 0.5 to about 3 parts by weight.

5. The photocationically polymerizable adhesive composition as claimed in claim 1, wherein the photopolymerization initiator is included in an amount of about 1 to about 5 parts by weight.

6. The photocationically polymerizable adhesive composition as claimed in claim 1, wherein the photopolymerization initiator includes at least one of an onium salt and an iron-arene complex.

7. The photocationically polymerizable adhesive composition as claimed in claim 1, further comprising about 0.1 to about 10 parts by weight of a photosensitizer, based on 100 parts by weight of the compound, the titanate coupling agent, and the photopolymerization initiator.

8. The photocationically polymerizable adhesive composition as claimed in claim 7, wherein the photosensitizer includes at least one of an organosulfur compound, a persulfide, a redox compound, an azo compound, a diazo compound, a halogen compound, and a photoreductive colorant.

9. An optical member, comprising:
   an optical sheet, wherein the photocationically polymerizable adhesive composition as claimed in claim 1 is applied to at least one side of the optical sheet.

10. The optical member as claimed in claim 9, wherein the titanate coupling agent is:
    a compound represented by Formula (1):

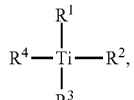

in Formula (1), $R^1$, $R^2$, $R^3$, and $R^4$ are each independently a group including one of

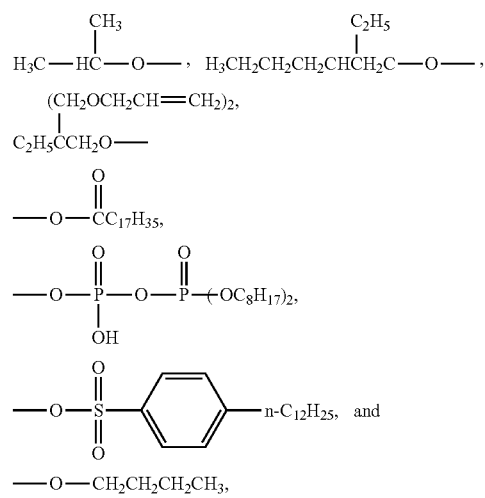

or two of $R^1$, $R^2$, $R^3$, and $R^4$ are connected to form a ring structure including one of

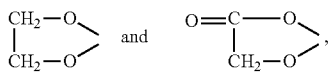

a dimer of the compound of Formula (1), or
a coordination compound of the compound of Formula (1) with one of the phosphites, below:

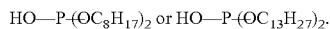

11. The optical member as claimed in claim 9, wherein the compound is included in an amount of about 92 to about 98.5 parts by weight.

12. The optical member as claimed in claim 9, wherein the titanate coupling agent is included in an amount of about 0.5 to about 3 parts by weight.

13. The optical member as claimed in claim 9, wherein the photopolymerization initiator is included in an amount of about 1 to about 5 parts by weight.

14. The optical member as claimed in claim 9, wherein the photopolymerization initiator includes at least one of an onium salt and an iron-arene complex.

15. The optical member as claimed in claim 9, further comprising about 0.1 to about 10 parts by weight of a photosensitizer, based on 100 parts by weight of the compound, the titanate coupling agent, and the photopolymerization initiator.

16. The optical member as claimed in claim 15, wherein the photosensitizer includes at least one of an organosulfur compound, a persulfide, a redox compound, an azo compound, a diazo compound, a halogen compound, and a photoreductive colorant.

* * * * *